US011351957B2

(12) United States Patent
Setterberg et al.

(10) Patent No.: US 11,351,957 B2
(45) Date of Patent: Jun. 7, 2022

(54) VEHICLE SEAT ASSEMBLY UTILIZING A STOWABLE SEAT BELT BUCKLE ASSEMBLY

(71) Applicant: Volvo Car Corporation, Gothenburg (SE)

(72) Inventors: Peter Setterberg, Partille (SE); Lars Modh, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 21 days.

(21) Appl. No.: 16/897,539

(22) Filed: Jun. 10, 2020

(65) Prior Publication Data
US 2021/0387592 A1    Dec. 16, 2021

(51) Int. Cl.
| | |
|---|---|
| *B60R 22/20* | (2006.01) |
| *B60N 2/20* | (2006.01) |
| *B60R 22/26* | (2006.01) |
| *B60R 22/18* | (2006.01) |

(52) U.S. Cl.
CPC ............ *B60R 22/20* (2013.01); *B60N 2/20* (2013.01); *B60R 22/26* (2013.01); *B60R 2022/1806* (2013.01)

(58) Field of Classification Search
CPC . B60R 22/20; B60R 22/26; B60R 2022/1806; B60N 2/20
See application file for complete search history.

(56) References Cited

U.S. PATENT DOCUMENTS

| | | | | |
|---|---|---|---|---|
| 5,332,261 | A | * | 7/1994 | Siepierski ............... B60R 22/22 280/801.1 |
| 6,908,155 | B1 | | 6/2005 | Wieclawski |
| 7,040,704 | B2 | | 5/2006 | Epaud |
| 7,527,332 | B2 | * | 5/2009 | Sakai .................. B60N 2/1615 297/216.1 |

(Continued)

FOREIGN PATENT DOCUMENTS

| | | |
|---|---|---|
| DE | 10242603 A | 4/2004 |
| DE | 102007023074 A | 11/2008 |

(Continued)

OTHER PUBLICATIONS

Sep. 21, 2021 European Search Report issued in corresponding International Application No. 21178031.

*Primary Examiner* — Philip F Gabler
(74) *Attorney, Agent, or Firm* — Clements Bernard Walker; Christopher L. Bernard (57) ABSTRACT

A seat assembly for a vehicle includes a seat bottom; a seat back pivotably coupled to the seat bottom; and a seat belt buckle assembly coupled to the seat bottom and the seat back and movable from a first configuration to a second configuration when the seat back is pivoted relative to the seat bottom such that the seat belt buckle assembly does not interfere with the seat back when the seat back is collapsed against the seat bottom. Optionally, the seat belt buckle assembly is translated downwards with respect to the seat bottom from the first configuration to the second configuration when the seat back is pivoted forwards relative to the seat bottom. Optionally, the seat belt buckle assembly is pivoted forwards with respect to the seat bottom from the first configuration to the second configuration when the seat back is pivoted forwards relative to the seat bottom.

14 Claims, 10 Drawing Sheets

(56) References Cited

U.S. PATENT DOCUMENTS

| | | | |
|---|---|---|---|
| 8,414,081 B2 | 4/2013 | Downey | |
| 8,459,748 B2 * | 6/2013 | Jovicevic | B60R 22/26 |
| | | | 297/481 |
| 8,628,145 B2 * | 1/2014 | Parida | B60N 2/3013 |
| | | | 297/481 |
| 8,657,371 B2 | 2/2014 | Matori | |
| 10,486,566 B2 * | 11/2019 | Namboodiri | B60N 2/688 |
| 10,611,333 B2 * | 4/2020 | Storck | B60R 22/20 |
| 2018/0093597 A1 | 4/2018 | Namboodiri et al. | |
| 2019/0351867 A1 | 11/2019 | Storck et al. | |

FOREIGN PATENT DOCUMENTS

| | | |
|---|---|---|
| JP | H0295953 A | 4/1990 |
| JP | H05105028 A | 4/1993 |
| JP | 2006088943 A | 4/2006 |

* cited by examiner

VEHICLE SEAT ASSEMBLY UTILIZING A STOWABLE SEAT BELT BUCKLE ASSEMBLY

TECHNICAL FIELD

The present disclosure relates generally to the automotive and vehicle seating fields. More particularly, the present disclosure relates to a vehicle seat assembly utilizing a stowable seat belt buckle assembly.

BACKGROUND

Many modern vehicles, including sport utility vehicles (SUVs), crossover vehicles, minivans, station wagons, sedans, and coupes, utilize second and third row seats that are collapsible to provide maximized trunk or hatch access and/or space. Typically, the seat backs of such seat assemblies fold forward until the seat backs contact the associated seat bottoms, effectively minimizing the form factor of such seat assemblies. One problem that is often encountered is that the seat belt buckle assemblies of these seat assemblies can interfere with the collapsing of the seat back against the associated seat bottom. Specifically, the seat belt buckle assembly can leave pressure marks in or otherwise damage the leather or fabric of the collapsed seat back, while resisting the nesting of the seat back against the associated seat bottom. It is desirable to prevent such pressure marks and damage and promote easy nesting of the seat back against the associated seat bottom.

This background provides an exemplary context in which the assemblies and methods of the present disclosure may be implemented. It will be readily apparent to those of ordinary skill in the art that the assemblies and methods may also be implemented in other contexts, without limitation.

SUMMARY

The present disclosure provides a seat assembly for a vehicle that includes a seat bottom and a seat back pivotably coupled to the seat bottom. A seat belt buckle assembly is coupled to the seat bottom and the seat back and is movable from a first (in use) configuration to a second (stowed) configuration when the seat back is pivoted relative to the seat bottom such that the seat belt buckle assembly does not interfere with the seat back when the seat back is collapsed against the seat bottom. Optionally, in the second (stowed) configuration, the seat belt buckle assembly is translated downwards with respect to the seat bottom from the first (in use) configuration when the seat back is pivoted forwards relative to the seat bottom. Optionally, in the second (stowed) configuration, the seat belt buckle assembly is pivoted forwards with respect to the seat bottom from the first (in use) configuration when the seat back is pivoted forwards relative to the seat bottom. This movement may be effectuated via mechanical linkages in a mechanical configuration and/or via control logic and electric motors in an electromechanical configuration.

In one exemplary embodiment, the present disclosure provides a seat assembly for a vehicle including: a seat bottom; a seat back pivotably coupled to the seat bottom; and a seat belt buckle assembly coupled to the seat bottom and the seat back and movable from a first configuration to a second configuration when the seat back is pivoted relative to the seat bottom such that the seat belt buckle assembly does not interfere with the seat back when the seat back is collapsed against the seat bottom. Optionally, the seat belt buckle assembly is translated downwards with respect to the seat bottom from the first configuration to the second configuration when the seat back is pivoted forwards relative to the seat bottom. Optionally, the seat belt buckle assembly is pivoted forwards with respect to the seat bottom from the first configuration to the second configuration when the seat back is pivoted forwards relative to the seat bottom. The seat belt buckle assembly is pivoted about a fixed pivot axis associated with a side support structure coupled to the seat bottom and the seat back. Optionally, the seat belt buckle assembly is coupled to the seat bottom and the seat back via a plurality of interconnected mechanical linkages. The plurality of interconnected mechanical linkages are configured to move the seat belt buckle assembly from the first configuration to the second configuration corresponding to the seat back being pivoted relative to the seat bottom. The seat belt buckle assembly includes a seat belt buckle receptacle adapted to receive a seat belt buckle.

In another exemplary embodiment, the present disclosure provides a seat support structure for a vehicle including: a side support structure adapted to pivotably couple a seat back to a seat bottom; and a seat belt buckle assembly coupled to the side support structure and movable from a first configuration to a second configuration when the seat back is pivoted relative to the seat bottom such that the seat belt buckle assembly does not interfere with the seat back when the seat back is collapsed against the seat bottom. Optionally, the seat belt buckle assembly is translated downwards with respect to the side support structure from the first configuration to the second configuration when the seat back is pivoted forwards relative to the seat bottom. Optionally, the seat belt buckle assembly is pivoted forwards with respect to the side structure from the first configuration to the second configuration when the seat back is pivoted forwards relative to the seat bottom. The seat belt buckle assembly is pivoted about a fixed pivot axis associated with the side support structure adapted to be coupled to the seat bottom and the seat back. Optionally, the seat belt buckle assembly is adapted to be coupled to the seat bottom and the seat back via a plurality of interconnected mechanical linkages. The plurality of interconnected mechanical linkages are configured to move the seat belt buckle assembly from the first configuration to the second configuration corresponding to the seat back being pivoted relative to the seat bottom. The seat belt buckle assembly includes a seat belt buckle receptacle adapted to receive a seat belt buckle.

In a further exemplary embodiment, the present disclosure provides a method including: given a seat bottom, a seat back pivotably coupled to the seat bottom, and a seat belt buckle assembly coupled to the seat bottom and the seat back, moving the seat belt buckle assembly from a first configuration to a second configuration when the seat back is pivoted relative to the seat bottom such that the seat belt buckle assembly does not interfere with the seat back when the seat back is collapsed against the seat bottom. Optionally, the method includes translating the seat belt buckle assembly downwards with respect to the seat bottom from the first configuration to the second configuration when the seat back is pivoted forwards relative to the seat bottom. Optionally, the method includes pivoting the seat belt buckle assembly forwards with respect to the seat bottom from the first configuration to the second configuration when the seat back is pivoted forwards relative to the seat bottom. The seat belt buckle assembly is pivoted about a fixed pivot axis associated with a side support structure coupled to the seat bottom and the seat back. Optionally, the seat belt buckle assembly is coupled to the seat bottom and the seat back via a plurality of interconnected mechanical linkages. The plurality of interconnected mechanical linkages are configured to move the seat belt buckle assembly from the first configuration to the second configuration corresponding to the seat back being pivoted relative to the seat bottom.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF EMBODIMENTS

Figure 1:
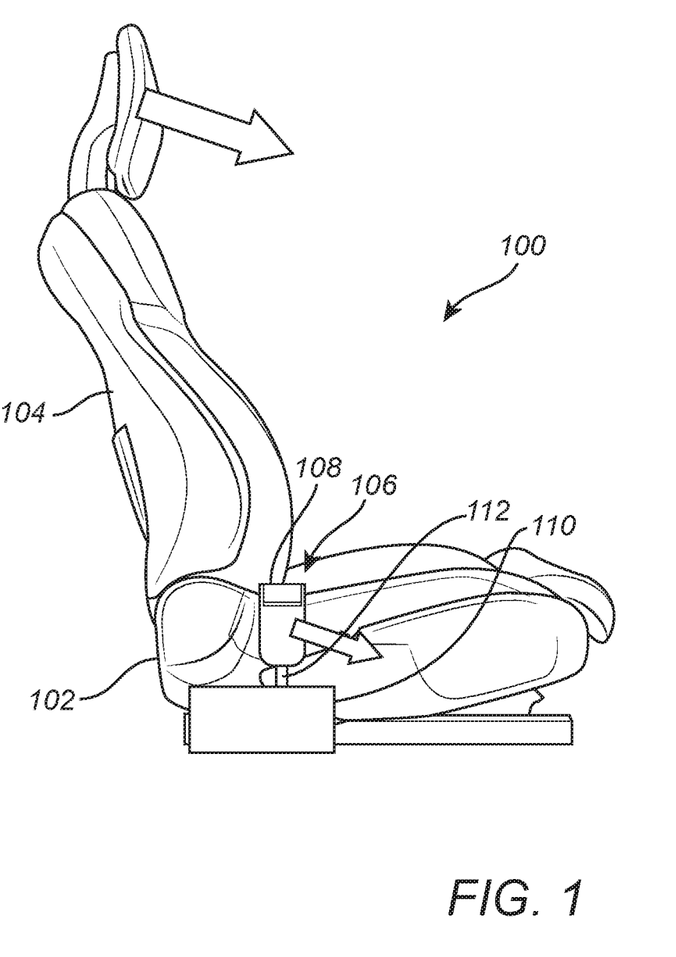
FIG. 1 is a schematic diagram illustrating the general translating/pivoting movement of the seat back and seat belt buckle assembly with respect to the seat bottom and side support structure of the present disclosure.

Referring now specifically to FIG. 1, in general, the present disclosure provides a seat assembly 100 for a vehicle that includes a seat bottom 102 and a seat back 104 pivotably coupled to the seat bottom 102. A seat belt buckle assembly 106 is coupled to the seat bottom 102 and the seat back 104 and is movable from a first (in use) configuration to a second (stowed) configuration when the seat back 104 is pivoted relative to the seat bottom 102 such that the seat belt buckle assembly 106 does not interfere with the seat back 104 when the seat back 104 is collapsed against the seat bottom 102. Optionally, in the second (stowed) configuration, the seat belt buckle assembly 106 is translated primarily or partially downwards with respect to the seat bottom 102 from the first (in use) configuration when the seat back 104 is pivoted forwards relative to the seat bottom 102. Optionally, in the second (stowed) configuration, the seat belt buckle assembly 106 is pivoted primarily or partially forwards with respect to the seat bottom 102 from the first (in use) configuration when the seat back 104 is pivoted forwards relative to the seat bottom 102. As described in greater detail herein below, this movement may be effectuated via mechanical linkages in a mechanical configuration and/or via control logic and electric motors in an electromechanical configuration. In general, when the seat back 104 is folded down into a stowed configuration, in which it is nested against the seat bottom 102, the seat belt buckle assembly 106 is first or simultaneously moved out of the way, such that easy nesting of the seat back 104 against the seat bottom 102 is promoted and pressure marks and damage to the leather or fabric of the seat back 104 and/or seat bottom 102, caused by the (otherwise intervening) seat belt buckle assembly 106, are prevented.

The seat belt buckle assembly 106 typically includes a seat belt buckle receptable 108 that is coupled to a side support structure 110 of the seat assembly 100 via an elongate arm member 112 or the like, although it will be readily apparent to those of ordinary skill in the art that other means for configuring and attaching the seat belt buckle receptacle 108 may also be utilized. The key aspect here is that this seat belt buckle receptacle 108 is deployed downwards and/or pivoted forwards to a stowed position when the seat back 104 is collapsed against the seat bottom 102, such that the seat belt buckle receptable 108 is out of the way.

Figure 2:
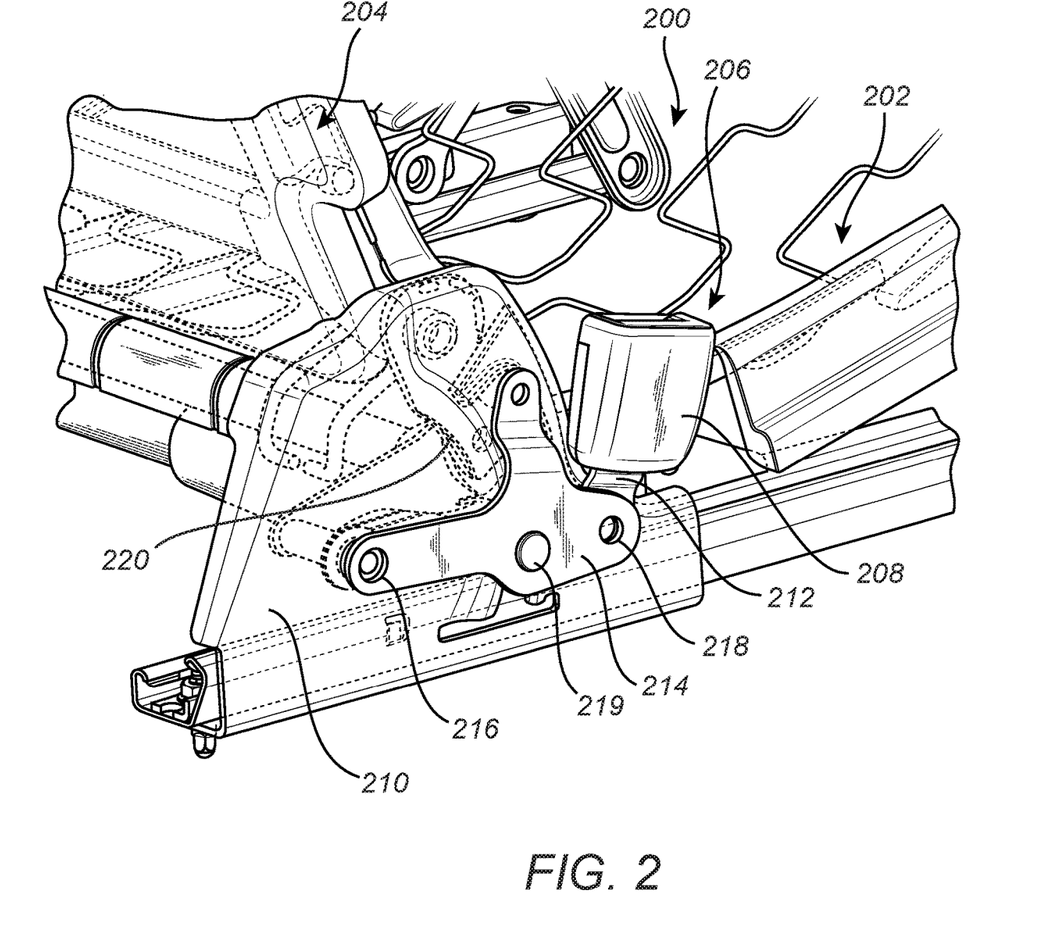
FIG. 2 is a partial (transparent) perspective view of the stowable seat belt buckle assembly of the present disclosure in the first (in use) configuration with the associated seat back not yet pivoted in relation to the seat bottom.
Figure 3:
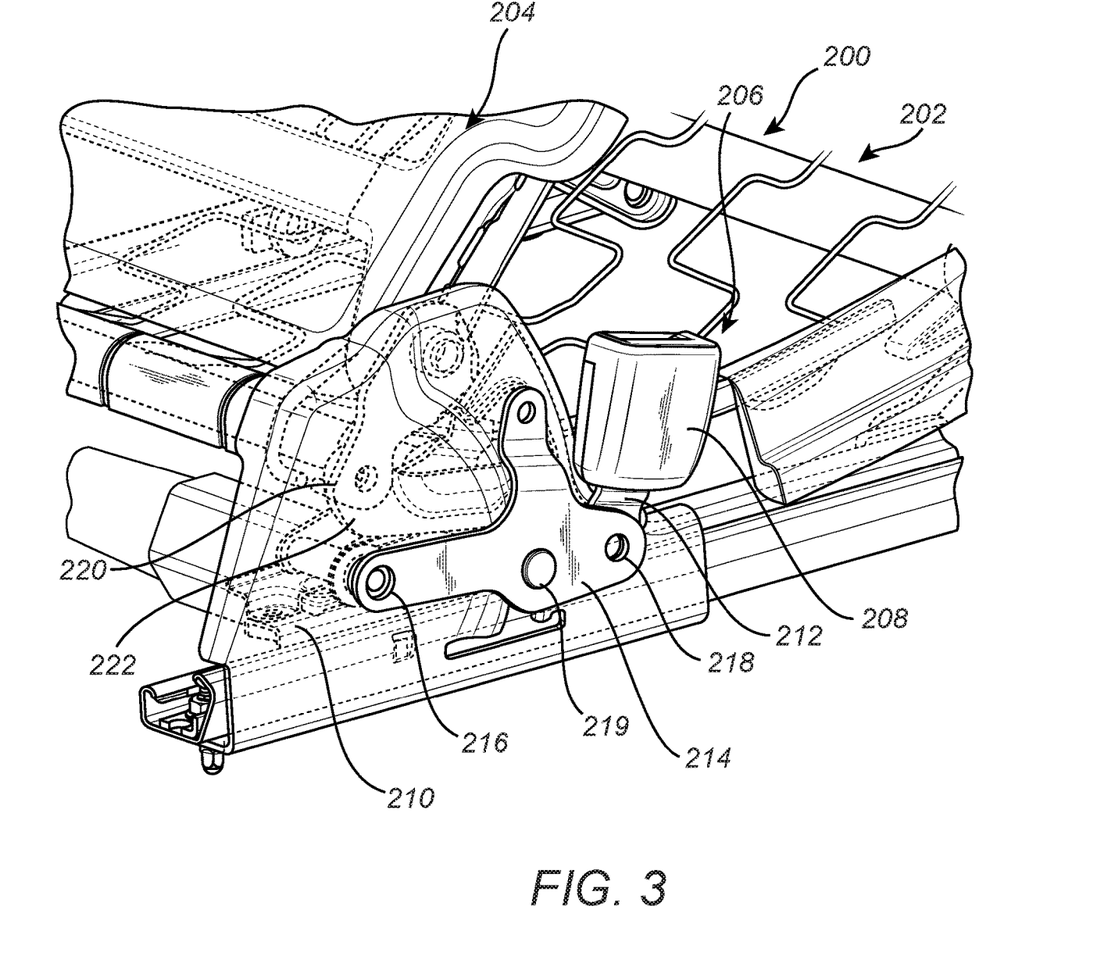
FIG. 3 is a partial (transparent) perspective view of the stowable seat belt buckle assembly of the present disclosure between the first (in use) configuration and the second (stowed) configuration with the associated seat back partially pivoted in relation to the seat bottom.
Figure 4:
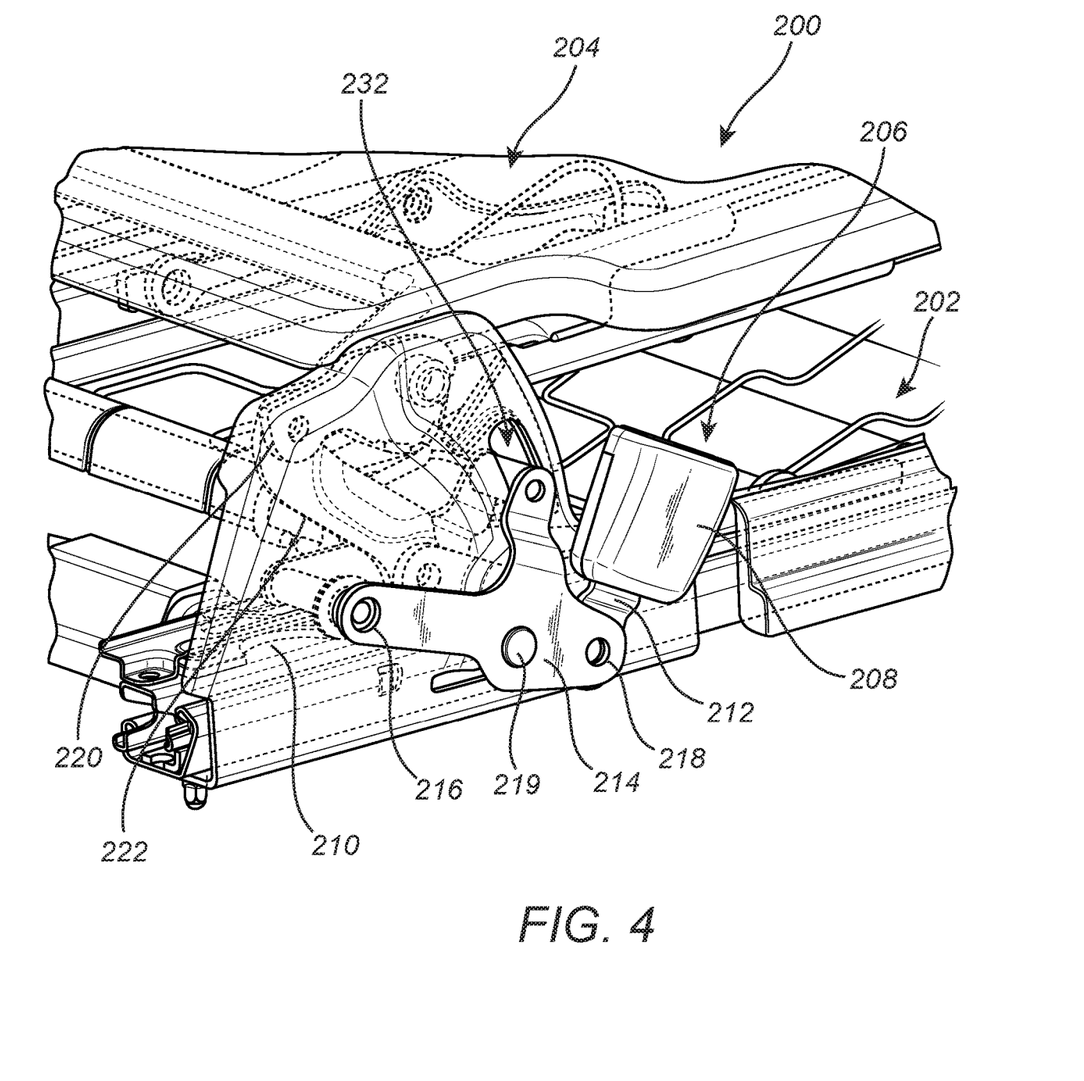
FIG. 4 is a partial (transparent) perspective view of the stowable seat belt buckle assembly of the present disclosure in the second (stowed) configuration with the associated seat back fully pivoted in relation to the seat bottom.

Referring now specifically to FIGS. 2-4, the seat back 204 is shown in progressive use and stowed configurations, with the seat belt buckle assembly 206 and seat belt buckle receptable 208 also shown in progressive corresponding use and stowed configurations. FIG. 2 shows the seat back 204 upright, with the seat belt buckle assembly 206 in a use configuration. FIG. 3 shows the seat back 204 partially collapsed forward, with the seat belt buckle assembly 206 still in a use configuration. FIG. 4 shows the seat back 204 fully collapsed forward against the seat bottom 202, with the seat belt buckle assembly 206 now in a stowed configuration.

In this exemplary embodiment, the seat belt buckle assembly 206 includes the seat belt buckle receptacle 208 and an elongate arm member 212. The seat belt buckle receptacle 208 is of any conventional type, with a latch mechanism (not illustrated) for receiving and retaining an associated tongue type seat belt buckle (not illustrated) and a button (not illustrated) for selectively releasing the latch mechanism and the seat belt buckle. The elongate arm member 212 may be substantially rigid or have a degree of flexibility, such that the seat belt buckle receptacle 208 can be more easily engaged with the associated seat belt buckle in use. Here, the elongate arm member 212 is fixedly or pivotably coupled to a pivot arm 214 of the seat belt buckle assembly 206. When used, the pivoting connection provides a degree of rotational resistance, such that the elongate arm member 212 will stay in a given alignment with respect to the pivot arm 214 unless a sufficient force is applied to the seat belt buckle receptacle 208 and elongate arm member 212 to change this alignment. The pivot arm 214 and other components of the seat belt buckle assembly 206 form a part of, are attached to, or are otherwise disposed within a housing (not illustrated) of the side support structure 210 of the seat assembly 200. In general, this side support structure provides an anchor point for the seat belt buckle assembly 206 and the rest of the seat assembly 200 to the chassis and frame structure (not illustrated) of the vehicle. This allows the seat belt buckle receptacle 208 and seat belt buckle assembly 206 (along with the related seat belt buckle and seat belt (not illustrated) to adequately restrain a vehicle occupant during an impact event. In use, the operation of the seat belt buckle assembly 206 is as conventional. It is the stowable nature of the seat belt buckle assembly 206 when the seat back 204 is collapsed that is unique.

The pivot arm 214 of the seat belt buckle assembly 206 forms a lever by which the elongate arm member 212 and seat belt buckle receptacle 208 of the seat belt buckle assembly 206 are moved/pivoted downwards/forwards when the seat back 204 is collapsed forward against the seat bottom 202. The pivot arm 214 pivots about a pivot joint 216 with the side support structure 210, disposed at an opposite end of the pivot arm 214 from the anchor point 218 of the elongate arm member 212. Thus, as the seat back 204 is collapsed forward against the seat bottom 202, the pivot arm 214 pivots about the pivot joint 216 with the side support structure 210, thereby moving/pivoting the anchor point 218 of the elongate arm member 212, the elongate arm member 212 itself, and seat belt buckle receptacle 208 of the seat belt buckle assembly 206 downwards/forwards in a levered manner. The pivot arm 214 is preferably manufactured from a strong, rigid material, such as a metal. Any suitable shape may be utilized, provided that the desired levering action is provided by this mechanical linkage and the mechanical linkage fits within any enclosure (not illustrated) associated with the side support structure 210. The use of such an enclosure is desirable to keep vehicle occupant appendages and the like from becoming pinched in the moving parts of the seat belt buckle assembly 206, the side support structure 210, and/or the seat assembly 200.

In general, the pivot arm 214 can be actuated by pivoting of the seat back 204 with respect to the seat bottom 202 by any number and configuration of intervening mechanical linkages and/or by an electric motor (not illustrated) and appropriate control logic (not illustrated), with the control logic sensing the degree of pivot of the seat back 204 with respect to the seat bottom 202 and deploying the pivot arm 214 appropriately to stow the seat belt buckle assembly 206. In this exemplary embodiment, however, the seat back 204 is equipped with an extension tab 220 that protrudes from a bottom corner of the seat back 204 and rotates in a levering manner with the seat back 204. The extension tab 220 of the seat back 204 is pivotably coupled to a first link member 222 (FIGS. 3 and 4) that is pivotably coupled (either directly or indirectly) to the pivot arm 214. The extension tab 220 and first link member 222 are preferably manufactured from a strong, rigid material, such as a metal. Any suitable shapes may be utilized, provided that the desired levering and actuation action is provided by this mechanical linkage and the mechanical linkage fits within any enclosure associated with the side support structure 210. Specifically, rotation of the extension tab 220 with the pivoting of the seat back 204 pulls the pivotably attached first link member 222, which correspondingly rotates the pivot arm 214 about the pivot joint 216, thereby moving/pivoting the anchor point 218 of the elongate arm member 212, the elongate arm member 212 itself, and seat belt buckle receptacle 208 of the seat belt buckle assembly 206 downwards/forwards in a levered manner. The specifics of this actuation are described in greater detail herein below.

It should be noted that, as illustrated in FIGS. 2-4, the pivot arm 214 may be movably affixed to the side support structure 210 in any number of ways, provided the pivoting motion of the pivot arm 214 is still enabled. As shown, the pivot arm 214 is coupled to the side support structure 210 via a rivet 219 or the like that is able to translate along a corresponding groove (not illustrated) or the like of the side support structure 210. This mid-pivot arm attachment point provides some structural support and movement guidance to the pivot arm 214.

Figure 5:
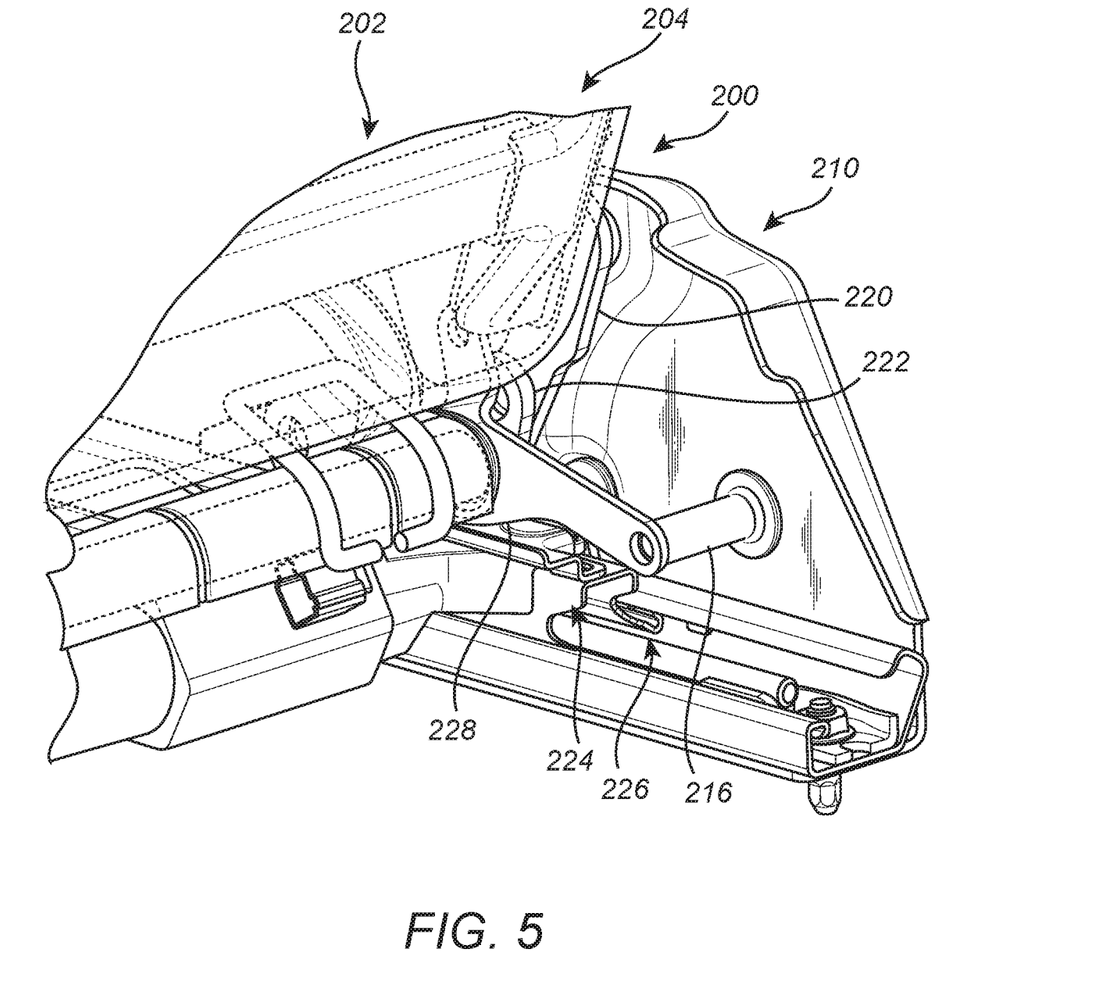
FIG. 5 is a partial (transparent) perspective view of the stowable seat belt buckle assembly of the present disclosure in the first (in use) configuration with the associated seat back not yet pivoted in relation to the seat bottom, highlighting the mechanical linkages coupling the seat belt buckle assembly to the seat back.
Figure 6:
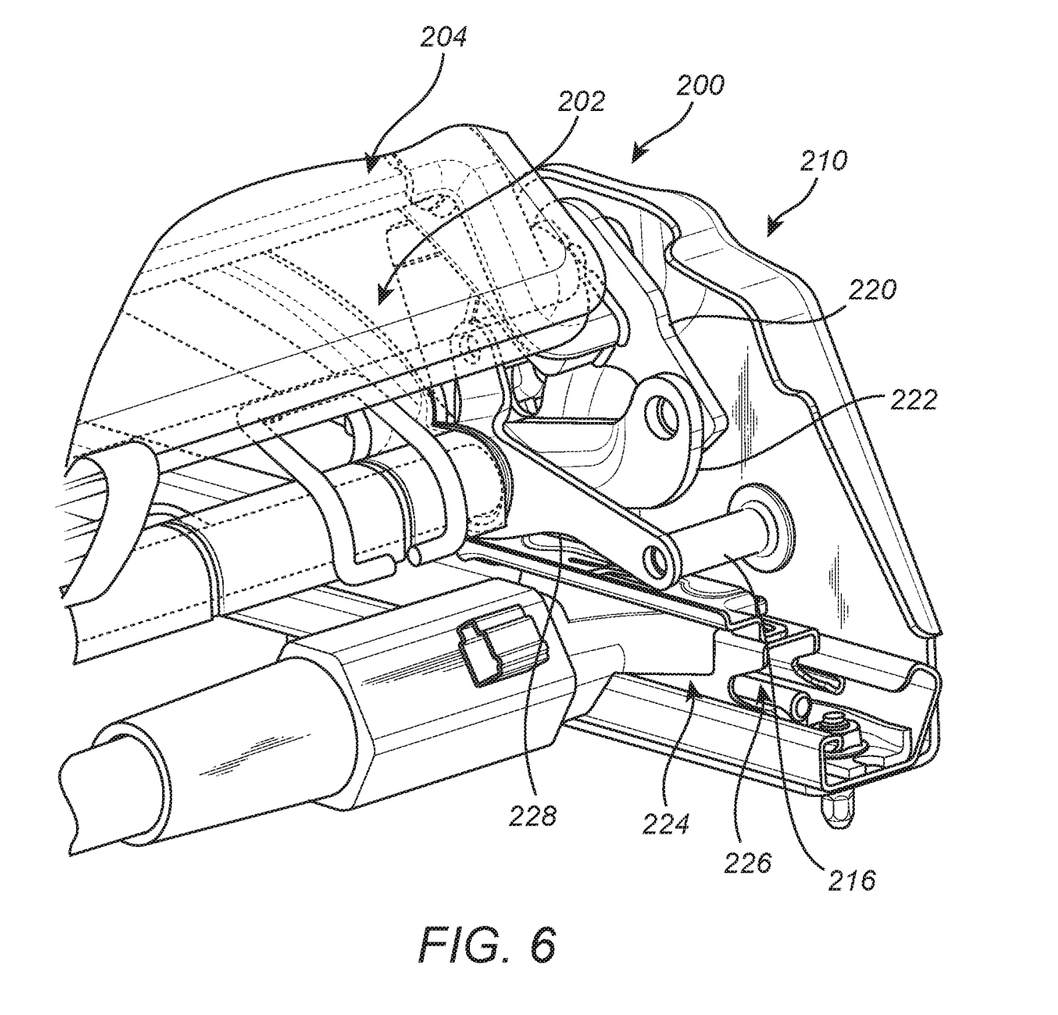
FIG. 6 is a partial (transparent) perspective view of the stowable seat belt buckle assembly of the present disclosure between the first (in use) configuration and the second (stowed) configuration with the associated seat back partially pivoted in relation to the seat bottom, highlighting the mechanical linkages coupling the seat belt buckle assembly to the seat back.
Figure 7:
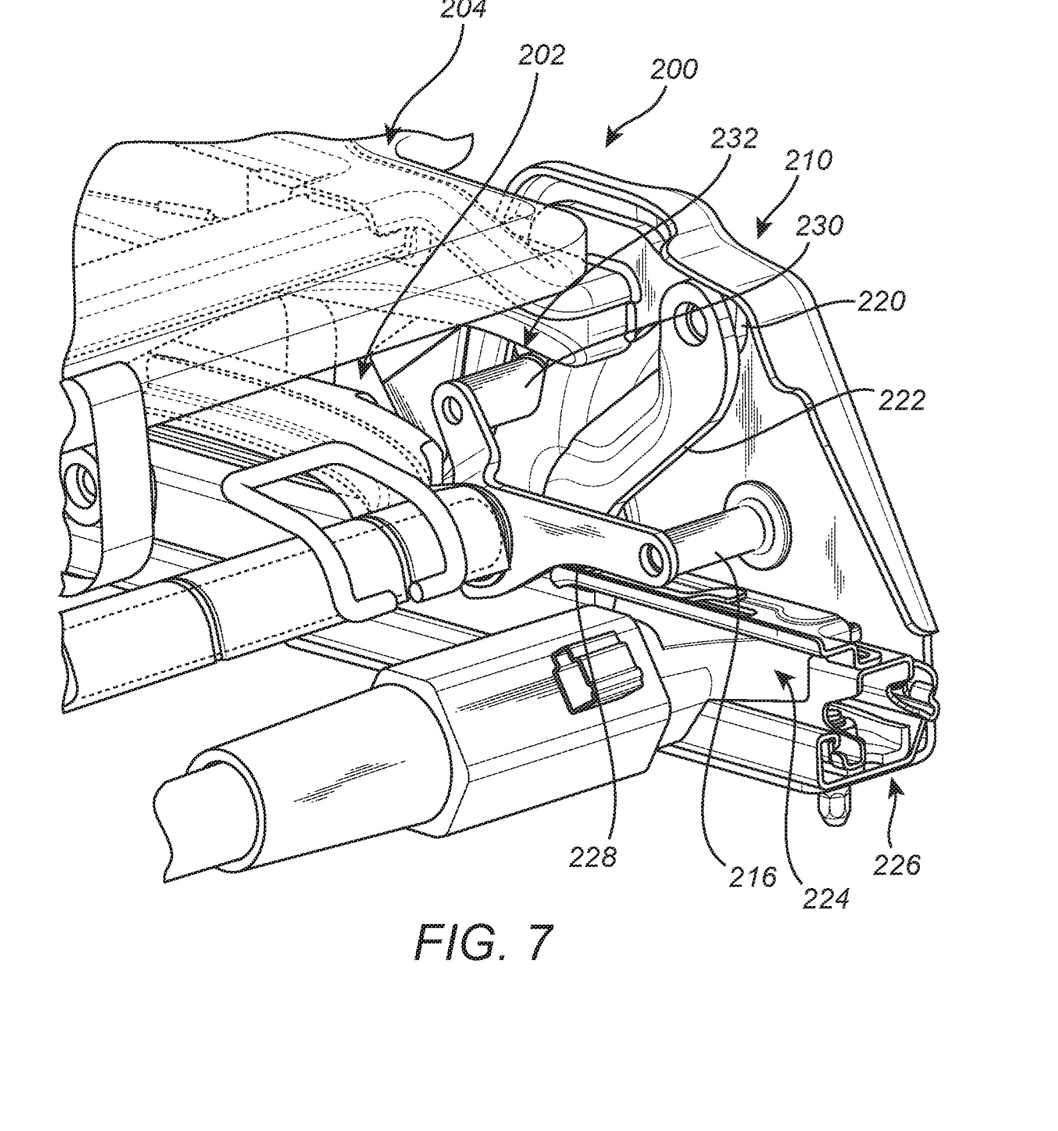
FIG. 7 is a partial (transparent) perspective view of the stowable seat belt buckle assembly of the present disclosure in the second (stowed) configuration with the associated seat back fully pivoted in relation to the seat bottom, highlighting the mechanical linkages coupling the seat belt buckle assembly to the seat back.

Referring now specifically to FIGS. 5-7, the seat back 204 is again shown in progressive use and stowed configurations, with the seat belt buckle assembly 206 (FIGS. 2-4) and seat belt buckle receptable 208 (FIGS. 2-4) also shown in progressive corresponding use and stowed configurations. FIG. 5 shows the seat back 204 upright, with the seat belt buckle assembly 206 in a use configuration. FIG. 6 shows the seat back 204 partially collapsed forward, with the seat belt buckle assembly 206 still in a use configuration. FIG. 7 shows the seat back 204 fully collapsed forward against the seat bottom 202, with the seat belt buckle assembly 206 now in a stowed configuration.

Here, it can be seen that the first link member 222 pivotably coupled to the extension tab 220 of the seat back 204 is pivotably coupled at an opposite end thereof to a slider mechanism 224 that translates along a track mechanism 226 with the collapsing of the seat back 204, thereby constraining the movement of the first link member 222 between the extension tab 222 and the pivot arm 214 (FIGS. 2-4). The first link member 222 is pivotably coupled to the pivot arm 214 via an interior pivot arm 228 to which the first link member 222 is pivotably coupled opposite the extension tab 220 of the seat back 204.

It should be noted that that the slider mechanism 224 and track mechanism 226 collectively used to constrain one end of the first link member 222 are not absolutely necessary components of the present disclosure. These components, although utilized here, are also used to provide other functionalities not strictly germane to the present disclosure. In general, the slider mechanism 224 and track mechanism 226 may also be used to impart a pivoting motion to the seat bottom 202 as the seat back 204 is pivoted. Thus, the mechanical linkages of the present disclosure make use of the slider mechanism 224 and track mechanism 226, but do not necessarily have to.

The interior pivot arm 228 to which first link member 222 is pivotably attached is shaped and configured similarly to the pivot arm 214, but disposed on an opposite side of the first link member 222. Like the pivot arm 214, the interior pivot arm 228 rotates about the pivot joint 216 formed with the side support structure 210. The interior pivot arm 228 is rigidly coupled to the pivot arm 214 via an intervening coupling member 230, so that the interior pivot arm 228 and the pivot arm 214 rotate in unison about the first link member 222 with movement of the seat back 204, the extension tab 220, and the first link member 222 (as well as any other intervening components), thereby collectively translating/pivoting the seat belt buckle assembly 206. The coupling member 30 may join a protruding arm or spoke of each of the interior pivot arm 218 and/or the pivot arm 214. In this exemplary embodiment, the interior pivot arm 228 is also pivotably coupled to the seat bottom 202 itself, causing the back portion of the seat bottom 202 to translate/pivot with the movement of the seat belt buckle assembly 206 in a complex coordinated manner. The interior pivot arm 228, like the pivot arm 214, is preferably manufactured from a strong, rigid material, such as a metal. Any suitable shape may be utilized, provided that the desired levering action is provided by this mechanical linkage and the mechanical linkage fits within any enclosure associated with the side support structure 210.

Referring now specifically to FIGS. 4 and 7, in this exemplary embodiment, a travel channel is defined within the side support structure to accommodate and guide the travel of the coupling member 230 disposed between the interior pivot arm 228 and the pivot arm 214. It should again be noted that a separate interior pivot arm 228 and pivot arm 214 are not necessary. A single pivot arm 214 can be coupled to the seat back 204 and used to translate/pivot the seat belt buckle assembly 206. Here, a separate interior pivot arm 228 and pivot arm 214 are used to translate/pivot a connection point of the seat bottom 202 in unison with the seat belt buckle assembly 206, which is not a focus of the present disclosure. Essentially, the dual pivot arms 214 and 228 are used in conjunction with an assembly that coordinates some movement between the seat back 204 and the seat bottom 202, with corresponding movement of the seat belt buckle assembly 206, the latter of which is the central focus of the present disclosure.

Figure 8:
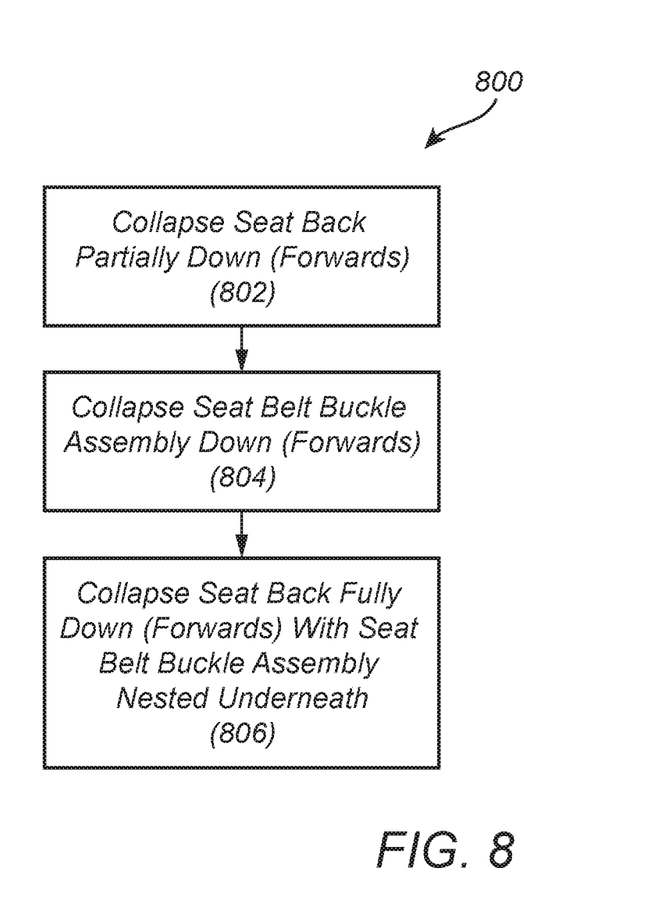
FIG. 8 is a flow chart of the method of the present disclosure by which the seat belt buckle assembly is stowed when the seat assembly is disposed in a stowed configuration.

Referring now specifically to FIG. 8 (and FIG. 1), in terms of the operation of the method 800, the present disclosure provides a seat assembly 100 for a vehicle that includes a seat bottom 102 and a seat back 104 pivotably coupled to the seat bottom 102. A seat belt buckle assembly 106 is coupled to the seat bottom 102 and the seat back 104 and is movable from a first (in use) configuration to a second (stowed) configuration when the seat back 104 is pivoted relative to the seat bottom 102 such that the seat belt buckle assembly 106 does not interfere with the seat back 104 when the seat back 104 is collapsed against the seat bottom 102. The seat back 104 is first collapsed partially down (forwards) 802. The seat belt buckle assembly is then correspondingly collapsed down (forwards) 804. Finally, the seat back 104 is collapsed fully down (forwards) with the seat belt buckle assembly 106 nested underneath 806. Optionally, in the second (stowed) configuration, the seat belt buckle assembly 106 is translated primarily or partially downwards with respect to the seat bottom 102 from the first (in use) configuration when the seat back 104 is pivoted forwards relative to the seat bottom 102. Optionally, in the second (stowed) configuration, the seat belt buckle assembly 106 is pivoted primarily or partially forwards with respect to the seat bottom 102 from the first (in use) configuration when the seat back 104 is pivoted forwards relative to the seat bottom 102. Again, this movement may be effectuated via mechanical linkages in a mechanical configuration and/or via control logic and electric motors in an electromechanical configuration. In general, when the seat back 104 is folded down into a stowed configuration, in which it is nested against the seat bottom 102, the seat belt buckle assembly 106 is first or simultaneously moved out of the way, such that easy nesting of the seat back 104 against the seat bottom 102 is promoted and pressure marks and damage to the leather or fabric of the seat back 104 and/or seat bottom 102, caused by the (otherwise intervening) seat belt buckle assembly 106, are prevented.

Figure 9:
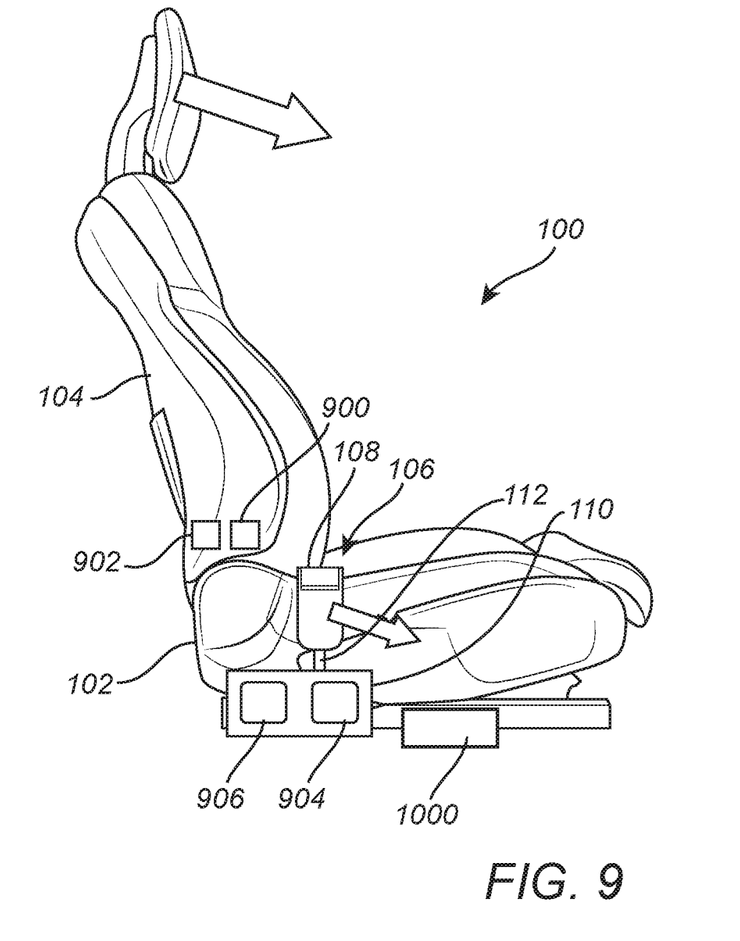
FIG. 9 is a schematic diagram illustrating the electronic actuation translating/pivoting movement of the seat back and seat belt buckle assembly with respect to the seat bottom and side support structure of the present disclosure.

Referring now specifically to FIG. 9, in another exemplary embodiment, the present disclosure again provides a seat assembly 100 for a vehicle that includes a seat bottom 102 and a seat back 104 pivotably coupled to the seat bottom 102. A seat belt buckle assembly 106 is coupled to the seat bottom 102 and the seat back 104 and is movable from a first (in use) configuration to a second (stowed) configuration when the seat back 104 is pivoted relative to the seat bottom 102 such that the seat belt buckle assembly 106 does not interfere with the seat back 104 when the seat back 104 is collapsed against the seat bottom 102. Here, everything is electronically monitored, controlled, and actuated. Optionally, in the second (stowed) configuration, the seat belt buckle assembly 106 is translated primarily or partially downwards with respect to the seat bottom 102 from the first (in use) configuration when the seat back 104 is pivoted forwards relative to the seat bottom 102. Optionally, in the second (stowed) configuration, the seat belt buckle assembly 106 is pivoted primarily or partially forwards with respect to the seat bottom 102 from the first (in use) configuration when the seat back 104 is pivoted forwards relative to the seat bottom 102. In general, when the seat back 104 is folded down into a stowed configuration, in which it is nested against the seat bottom 102, the seat belt buckle assembly 106 is first or simultaneously moved out of the way, such that easy nesting of the seat back 104 against the seat bottom 102 is promoted and pressure marks and damage to the leather or fabric of the seat back 104 and/or seat bottom 102, caused by the (otherwise intervening) seat belt buckle assembly 106, are prevented. Here, the degree of pivoting of the seat back 104 is actuated and controlled by an electric motor 900 coupled to the seat back 104 and controlled by the vehicle occupant, and monitored by a pivot sensor 902 also coupled to the seat back 104. The corresponding degree of translating or pivoting of the seat belt buckle assembly 106 is also actuated and controlled by an electric motor 904 coupled to the seat belt buckle assembly 106, and monitored by a deployment sensor 906 also coupled to the seat belt buckle assembly 106. The actuation of the seat back 104 and the seat belt buckle assembly 106 are coordinated by an electronic control unit (ECU) 1000.

Figure 10:
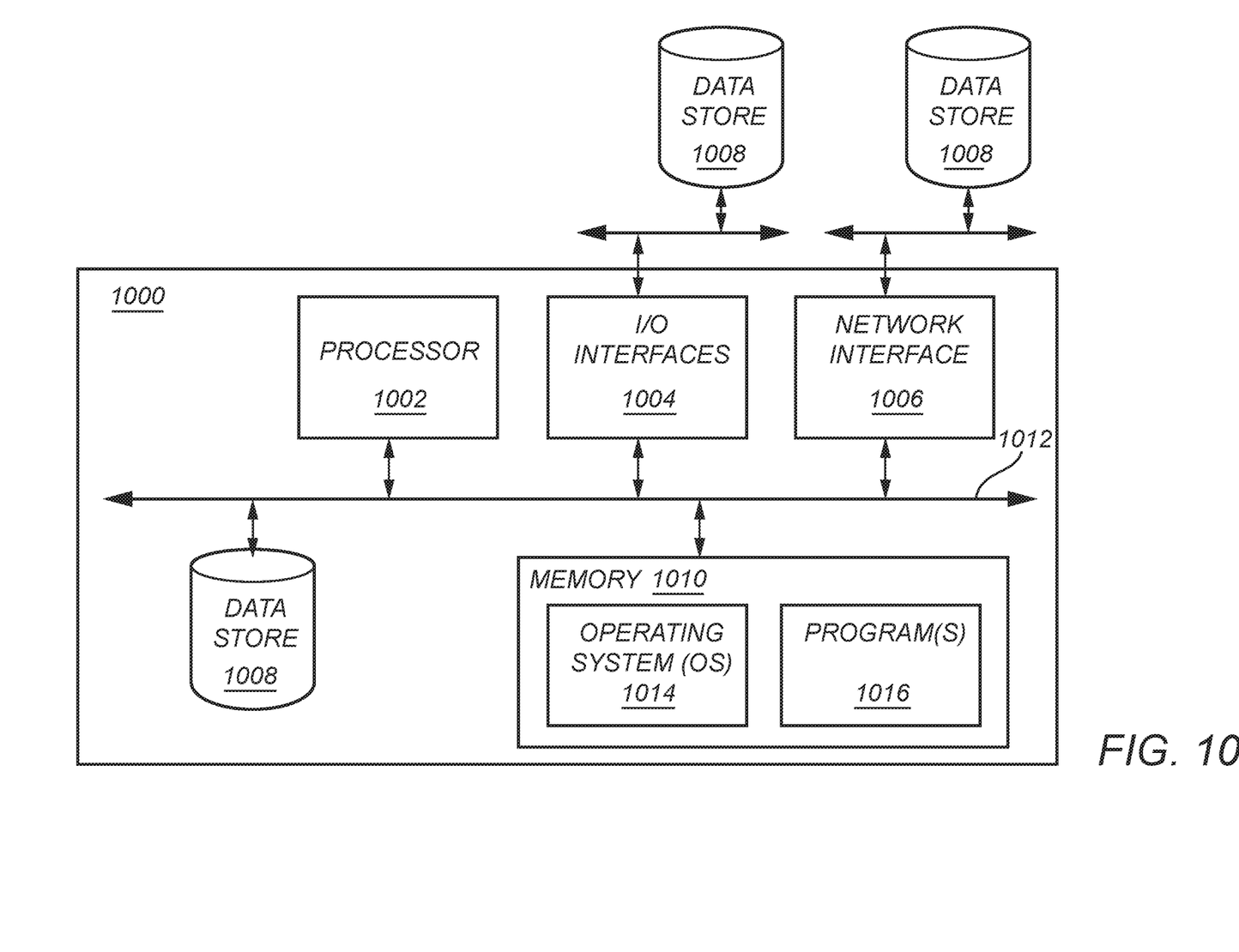
FIG. 10 is a schematic diagram illustrating a general purpose computer control system that may be utilized in conjunction with the assemblies and methods of the present disclosure.

FIG. 10 is a block diagram of the ECU 1000. The ECU 1000 may be a digital computer that, in terms of hardware architecture, generally includes a processor 1002, input/output (I/O) interfaces 1004, a network interface 1006, a data store 1008, and memory 1010. It should be appreciated by those of ordinary skill in the art that FIG. 10 depicts the ECU 1000 in an oversimplified manner, and a practical embodiment may include additional components and suitably configured processing logic to support known or conventional operating features that are not described in detail herein. The components (1002, 1004, 1006, 1008, and 1010) are communicatively coupled via a local interface 1012. The local interface 1012 may be, for example, but is not limited to, one or more buses or other wired or wireless connections, as is known in the art. The local interface 1012 may have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may be any custom made or commercially available processor, a central processing unit (CPU), an auxiliary processor among several processors associated with the ECU 1000, a semiconductor-based microprocessor (in the form of a microchip or chipset), or generally any device for executing software instructions. When the ECU 1000 is in operation, the processor 1002 is configured to execute software stored within the memory 1010, to communicate data to and from the memory 1010, and to generally control operations of the ECU 1000 pursuant to the software instructions. The I/O interfaces 1004 may be used to receive user input from and/or for providing system output to one or more devices or components.

The network interface 1006 may be used to enable the ECU 1000 to communicate on a network. The network interface 1006 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 1006 may include address, control, and/or data connections to enable appropriate communications on the network. A data store 1008 may be used to store data. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media. In one example, the data store 1008 may be located internal to the ECU 1000, such as, for example, an internal hard drive connected to the local interface 1012 in the ECU 1000. Additionally, in another embodiment, the data store 1008 may be located external to the ECU 1000 such as, for example, an external hard drive connected to the I/O interfaces 1004 (e.g., a SCSI or USB connection). In a further embodiment, the data store 1008 may be connected to the ECU 1000 through a network, such as, for example, a network-attached file server.

The memory 1010 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1010 may incorporate electronic, magnetic, optical, and/or other types of storage media. Note that the memory 1010 may have a distributed architecture, where various components are situated remotely from one another but can be accessed by the processor 1002. The software in memory 1010 may include one or more software programs, each of which includes an ordered listing of executable instructions for implementing logical functions. The software in the memory 1010 includes a suitable operating system (O/S) 1014 and one or more programs 1016. The operating system 1014 essentially controls the execution of other computer programs, such as the one or more programs 1016, and provides scheduling, input-output control, file and data management, memory management, and communication control and related services. The one or more programs 1016 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A seat assembly for a vehicle, comprising:
a seat bottom;
a seat back pivotably coupled to the seat bottom;
a seat belt buckle assembly comprising an elongate arm member and a seat belt buckle receptacle;
an extension tab protruding from a bottom corner of the seat back;
a pivot arm coupled to the elongate arm member of the seat belt buckle assembly at an anchor point at one end of the pivot arm and pivoting about a pivot joint disposed at an opposite end of the pivot arm; and
one or more link members coupled between the extension tab and the pivot arm and adapted to pivot the one end of the pivot arm downwards about the pivot joint disposed at the opposite end of the pivot arm when the extension tab is pivoted with the seat back;
wherein the seat belt buckle assembly is thereby coupled to the seat bottom and the seat back and movable from a first configuration to a second configuration when the seat back is pivoted relative to the seat bottom such that the seat belt buckle assembly does not interfere with the seat back when the seat back is collapsed against the seat bottom.

2. The seat assembly of claim 1, wherein the seat belt buckle assembly is translated downwards with respect to the seat bottom from the first configuration to the second configuration when the seat back is pivoted forwards relative to the seat bottom.

3. The seat assembly of claim 1, wherein the seat belt buckle assembly is pivoted forwards with respect to the seat bottom from the first configuration to the second configuration when the seat back is pivoted forwards relative to the seat bottom.

4. The seat assembly of claim 3, wherein the seat belt buckle assembly is pivoted about a fixed pivot axis associated with a side support structure coupled to the seat bottom and the seat back.

5. The seat assembly of claim 1, wherein the seat belt buckle assembly is coupled to the seat bottom and the seat back via a plurality of additional interconnected link members.

6. The seat assembly of claim 5, wherein the plurality of additional interconnected link members are further configured to move the seat belt buckle assembly from the first configuration to the second configuration corresponding to the seat back being pivoted relative to the seat bottom.

7. The seat assembly of claim 1, wherein the anchor point at the one end of the pivot arm at which the elongate arm member of the seat belt buckle assembly is coupled to the pivot arm is a pivot point.

8. A seat support structure for a vehicle, comprising:
a side support structure adapted to pivotably couple a seat back to a seat bottom;
a seat belt buckle assembly comprising an elongate arm member and a seat belt buckle receptacle coupled to the side support structure;
a pivot arm coupled to the elongate arm member of the seat belt buckle assembly at an anchor point at one end of the pivot arm and pivoting about a pivot joint disposed at an opposite end of the pivot arm; and
one or more link members adapted to be coupled between an extension tab protruding from a bottom corner of the seat back and the pivot arm and adapted to pivot the one end of the pivot arm downwards about the pivot joint disposed at the opposite end of the pivot arm when the extension tab is pivoted with the seat back;
wherein the seat belt buckle assembly is thereby movable from a first configuration to a second configuration when the seat back is pivoted relative to the seat bottom such that the seat belt buckle assembly does not interfere with the seat back when the seat back is collapsed against the seat bottom.

9. The seat support structure of claim 8, wherein the seat belt buckle assembly is translated downwards with respect to the side support structure from the first configuration to the second configuration when the seat back is pivoted forwards relative to the seat bottom.

10. The seat support structure of claim 8, wherein the seat belt buckle assembly is pivoted forwards with respect to the side structure from the first configuration to the second configuration when the seat back is pivoted forwards relative to the seat bottom.

11. The seat support structure of claim 10, wherein the seat belt buckle assembly is pivoted about a fixed pivot axis associated with the side support structure adapted to be coupled to the seat bottom and the seat back.

12. The seat support structure of claim 8, wherein the seat belt buckle assembly is adapted to be coupled to the seat bottom and the seat back via a plurality of additional interconnected link members.

13. The seat support structure of claim 12, wherein the plurality of additional interconnected link members are further configured to move the seat belt buckle assembly from the first configuration to the second configuration corresponding to the seat back being pivoted relative to the seat bottom.

14. The seat support structure of claim 8, wherein the anchor point at the one end of the pivot arm at which the elongate arm member of the seat belt buckle assembly is coupled to the pivot arm is a pivot point.

* * * * *